United States Patent [19]

Staciokas

[11] 4,377,761
[45] Mar. 22, 1983

[54] LINEAR STEPPER MOTOR DRIVE WITH A READ/WRITE HEAD IN A FLOPPY DISC SYSTEM

[75] Inventor: Leon J. Staciokas, Downingtown, Pa.

[73] Assignee: Exxon Research & Engineering Co., Florham Park, N.J.

[21] Appl. No.: 120,267

[22] Filed: Feb. 11, 1980

Related U.S. Application Data

[63] Continuation of Ser. No. 872,617, Jan. 26, 1978, abandoned.

[51] Int. Cl.³ ............................................. H02K 41/00
[52] U.S. Cl. .......................................... 310/12; 310/14
[58] Field of Search ..................... 310/12–14, 310/90; 318/135

[56] References Cited

U.S. PATENT DOCUMENTS

| | | | |
|---|---|---|---|
| 3,130,331 | 4/1964 | Jallen et al. | 310/14 |
| 3,177,384 | 4/1965 | Montagu | 310/12 |
| 3,185,909 | 5/1965 | Jahn | 310/12 X |
| 3,219,853 | 11/1965 | Schreiber | 310/14 |
| 3,548,273 | 12/1970 | Parodi et al. | 310/14 X |
| 3,716,731 | 2/1973 | Nilsson | 310/12 |

*Primary Examiner*—Donovan F. Duggan
*Attorney, Agent, or Firm*—Norman L. Norris

[57] ABSTRACT

A linear stepper motor drives a read/write head in a radial path across a floppy disc. The linear stepper motor comprises a stator including a plurality of pole positions having windings associated therewith which are energized in different phases and a slider. The slider includes a plurality of teeth which cooperate with the teeth of the stator at the various pole positions so as to form a variable reluctance path through the slider. Longitudinally extending grooves of the slider cooperate with similar grooves in the stator to receive bearings for supporting the slider in the stator-to-stator air gap of the stator.

2 Claims, 4 Drawing Figures

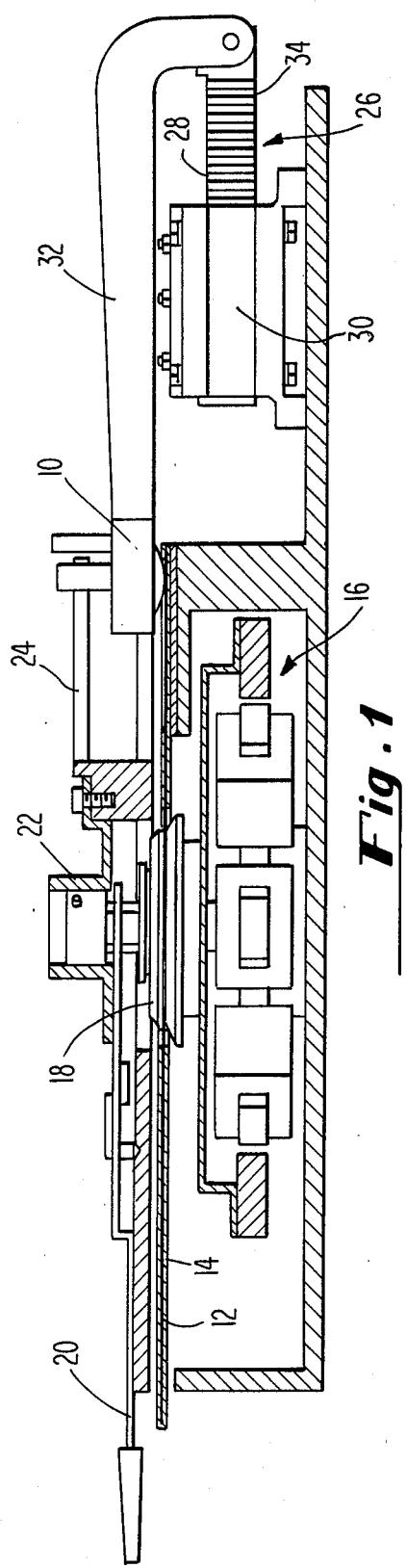
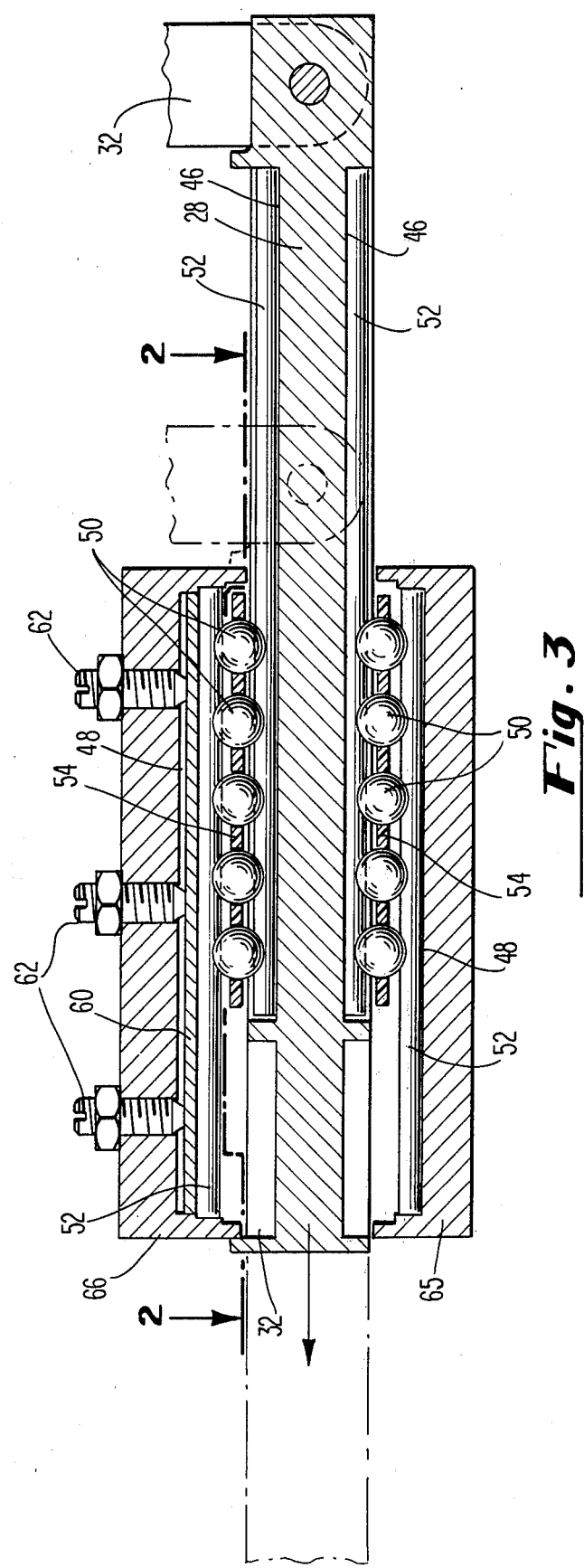

LINEAR STEPPER MOTOR DRIVE WITH A READ/WRITE HEAD IN A FLOPPY DISC SYSTEM

This is a continuation of application Ser. No. 872,617, filed 1/26/78, now abandoned.

BACKGROUND OF THE INVENTION

This invention relates to magnetic data storage discs, and more particularly, to so-called "floppy discs."

In prior art floppy disc drives, the floppy disc has been rotated about its axis to create an arcuate movement of the floppy disc relative to the read/write head which is driven along a radial path across the floppy disc so as to place the read/write head in magnetic communication with the floppy disc in a plurality of concentric tracks on the disc. In other words, the rotational movement of the floppy disc moves the disc relative to the head through so-called sectors of the disc. In addition, the head is indexed in a generally radial path from concentric track to concentric track of the floppy disc.

Heretofore, the radial movement of the read/write head has been achieved by rotary stepper motors in combination with appropriate mechanical apparatus for translating rotational movement into linear movement. A drive of this type is incorporated in the floppy disc system manufactured by Shugart Associates of Sunnyvale, California Linear motors of the voice-coil type have been incorporated in the head drive of large magnetic storage discs other than the floppy type. See U.S. Pat. No. 3,521,092 to Kalthoff.

"Theory and Application of Step Motors," edited by Benjamin Kuo, West Publishing Co., 1974, discloses the use of linear stepper motors rather than rotary stepper motors in combination with rotary-to-linear motion translators. A number of different types of stepper motors are also disclosed therein. Linear stepper motors for various uses or applications are also disclosed in copending application Ser. No. 809,646 filed June 24, 1977, Ser. No. 833,271 filed Sept. 14, 1977, Schreiber et al U.S. Pat. No. 3,162,796 and Chai U.S. Pat. No. 3,867,676.

SUMMARY OF THE INVENTION

It is an object of this invention to provide a floppy disc read/write head drive which is characterized by compactness and simplicity.

It is a further object of this invention to provide a floppy disc read/write head drive which is reliable.

It is a further object of this invention to provide a floppy disc read/write head drive which is relatively inexpensive.

In accordance with these and other objects of the invention, a floppy disc drive comprises a rotary drive means for rotating the floppy disc, a read/write head for reading or writing data on the disc, and a linear drive means for linearly moving the head along a radial path across the disc.

In accordance with this invention, the linear drive means comprises a linear stepper motor including a stationary magnetic structure and a sliding magnetic structure. One of the structures includes a plurality of pole positions having windings associated therewith which are energized in different phases so as to produce linear motion of the sliding magnetic structure through a plurality of magnetically inherent step positions.

In a preferred embodiment of the invention, the linear motor is of the variable reluctance type and the sliding structure as well as the stationary structure include a series of magnetic discontinuities for creating variable reluctance paths from the stationary magnetic structure through the sliding magnetic structure. Preferably, the stationary magnetic structure includes the plurality of pole positions and carries the windings and the magnetic discontinuities or teeth are formed at the pole positions as well as along the length of the sliding magnetic structure.

In accordance with another important aspect of the invention, the sliding magnetic structure which is coupled to the read/write head is supported by the stationary magnetic structure. In this connection, bearing raceways are formed by the sliding magnetic structure and the stationary magnetic structure. Preferably, a groove is formed in the sliding magnetic structure for this purpose in a manner so as not to disturb the magnetic properties of the sliding magnetic structure.

In the preferred embodiment of the invention, the teeth of the sliding magnetic structure are formed on two opposing sides of the sliding magnetic structure and extend generally perpendicular to the plane of the floppy disc. A pair of grooves forming part of the raceway are located on another two opposing sides of the sliding magnetic structure and extend in a plane substantially parallel with the plane of the floppy disc.

BRIEF DESCRIPTION OF THE DRAWINGS

FIG. 1 is a sectional view of a floppy disc drive;

FIG. 3 is a sectional view taken along line 3—3 of FIG. 4; and

DETAILED DESCRIPTION OF A PREFERRED EMBODIMENT

Figure 2:
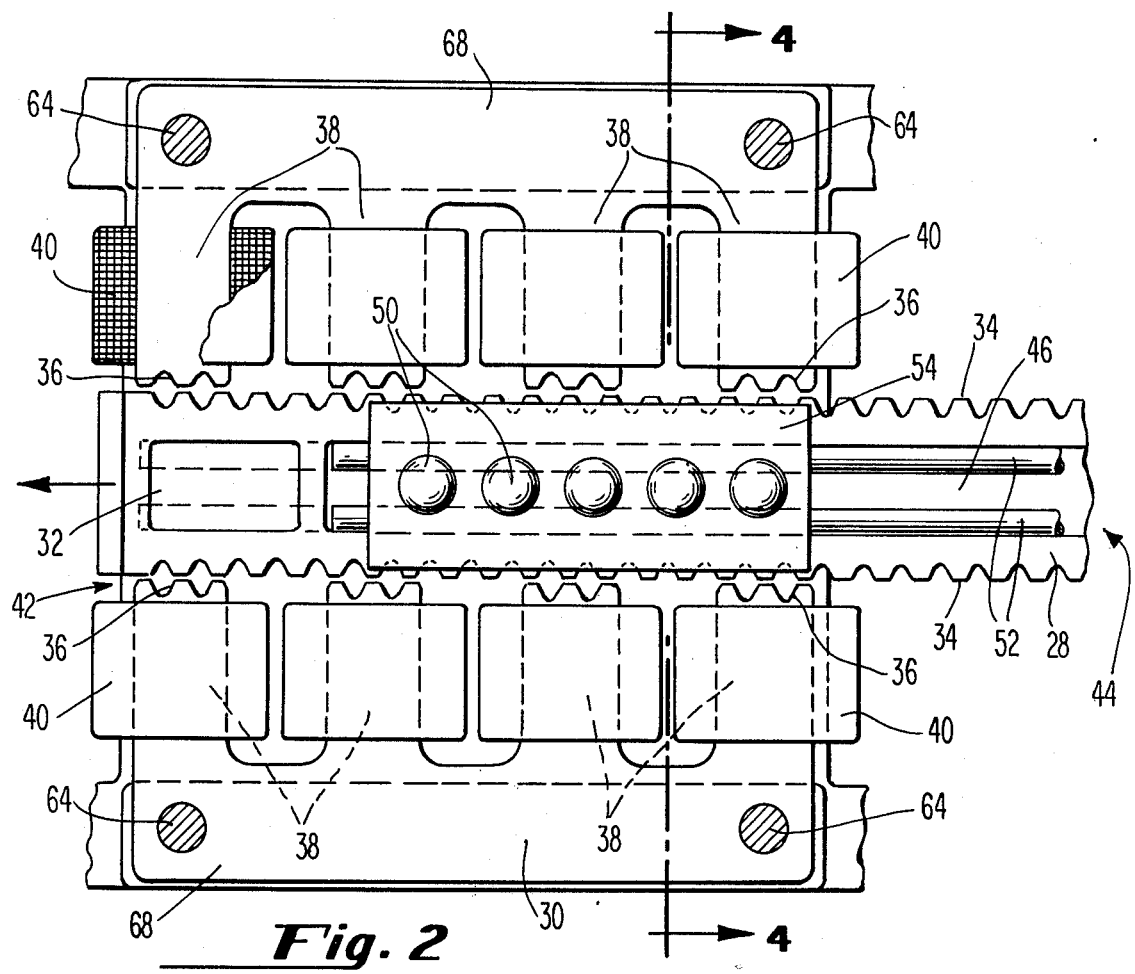
FIG. 2 is an enlarged sectional view of the read/write head linear drive taken along line 2—2 of FIG. 3.

A floppy disc data storage and retrieval system is shown as comprising a read/write head 10 in magnetic communication with a floppy disc 12 mounted within a jacket 14. The floppy disc 12 is rotated about its axis within the jacket 14 by means of a brushless DC motor comprising a variable reluctance rotary stepper motor 16 in accordance with the invention of copending application Ser. No. 833,265 filed Sept. 14, 1977, which is assigned to the assignee of this invention and incorporated herein by reference.

The floppy disc 12 is driven by the motor through a clamp 18 which is seated on the central area of the disc in response to movement of a lever 20 which is coupled to the clamp 18 through a helical translating mechanism 22 which is described in detail in copending application Ser. No. 872,618 filed Jan. 26, 1978 which is assigned to the assignee of this invention and incorporated herein by reference. In addition, the lever 20 serves to raise and lower the read/write head 10 by means of a linkage 24 which is also described in the aforesaid copending application Ser. No. 872,618.

In accordance with this invention, the radial movement of the read/write head 10 with respect to the floppy disc 12 is achieved by means of a linear stepper motor 26 which comprises a sliding magnetic structure or slider 28 and a stationary magnetic structure or stator 30. One end of the slider 28 is connected to an arm 32 which extends to the read/write head 10 to couple the linear motion of the slider 28 to the read/write head 10.

Figure 4:
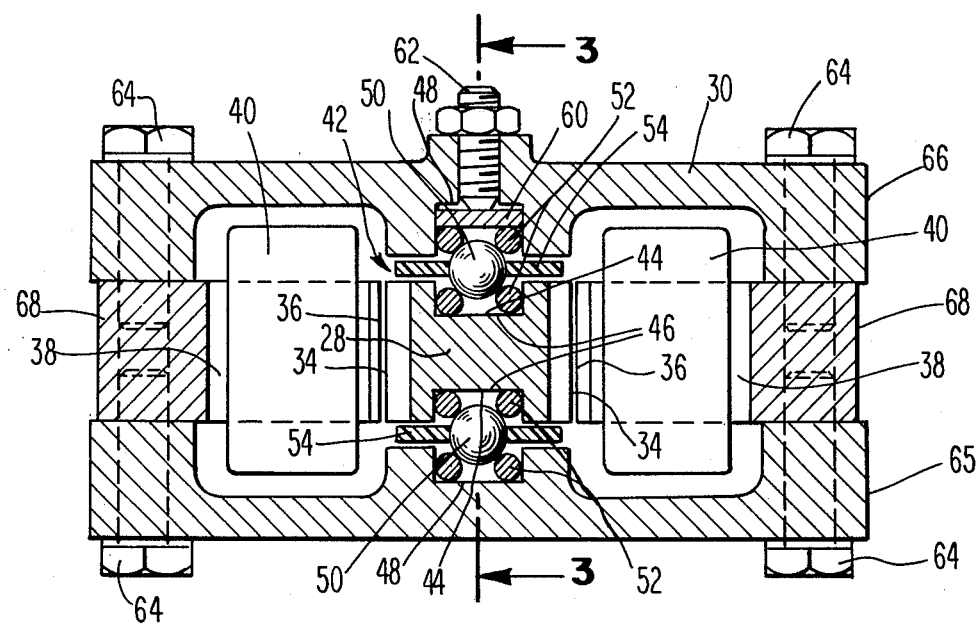
FIG. 4 is a sectional view taken along line 4—4 of FIG. 2.

Referring now to the more detailed drawings of FIGS. 2-4, the linear stepper motor 26 is of the variable reluctance type having a plurality of magnetic discontinuities or teeth 34 having crests and valleys extending generally perpendicular to the plane of the floppy disc along opposite sides of the slider 28 at various longitudinal positions and generally transverse to the direction of slider movement. Similar magnetic discontinuities or teeth 36 are located at the various pole faces or positions 38 of the stator 30. As windings 40 associated with the various pole positions 38 are energized in selected phases, the slider 28 is stepped through magnetically inherent step positions along the stator-to-stator air gap 42 as various flux paths are closed through the slider 28 in accordance with well known stepper-motor techniques disclosed in the aforesaid "Theory and Applications of Step Motors" which is incorporated herein by reference.

In accordance with another important aspect of this invention, the slider 28 is actually supported by the stator 30. In this connection, bearing raceways 44 are formed in the slider 28 and the stator 30 as best shown in FIG. 4. These raceways are formed by grooves centrally located in the opposite sides of the slider 28 which extend substantially parallel with the plane of the floppy disc 12 whereas the teeth 34 extend in a plane substantially perpendicular to the floppy disc 12. The stator 30 also includes grooves 48 which are juxtaposed to the slider grooves 46. It will be noted that sufficient magnetic material is left between the slider grooves 46 so as to avoid interference with flux paths through the slider 28.

Ball bearings 50 are located within the raceways 44. Each corner of the grooves 46 and 48 is filled with rods 52 of circular cross-section forming pairs of raised surfaces in each groove on which the bearings ride. Retaining members 54 having holes 56 space and hold the bearings 50 in place within the grooves 46 and 48.

The friction of the raceways 44 is controlled by adjusting the position of a pad 60 by means of set screws 62.

The stator 30 comprises three distinct pieces which are secured together by means of bolts 64. Upper and lower plates of the stator 65 and 66 clamp an active portion 68 which includes the pole positions 38 and the stator teeth 36. It will therefore be understood that the stator 36 may be easily assembled after the slider 28 is placed within the stator-to-stator air gap.

Although a preferred embodiment of the invention has been shown and described, it will be understood that various modifications may be made without departing from the true spirit and scope of the invention as set forth in the appended claims.

What is claimed is:

1. A drive for a magnetic data storage disc comprising:
   a rotary drive means for rotating a magnetic data storage disc;
   a read/write head for reading or writing data on the disc; and
   linear drive means for linearly moving said head along a radial path across said disc, said linear drive means comprising a linear stepper motor of the variable reluctance type including:
   a stationary magnetic structure;
   a sliding magnetic structure; and
   bearing means for supporting said sliding structure on said stationary structure;
   said stationary structure including a plurality of pole positions having windings associated therewith and adapted to be energized in various phases so as to produce linear motion of said slider through a plurality of magnetically inherent step positions;
   said sliding structure comprising magnetic material having a plurality of magnetic discontinuities therein, the overall length of said plurality of discontinuities along said structure being longer than said stationary magnetic structure;
   said sliding structure and said stationary structure further forming a pair of bearing raceways, each of said raceways having closed ends and being centrally located on a pair of opposite sides of said sliding structure;
   said bearing means being confined in said pair of raceways, each of said pair of raceways being formed by juxtaposed grooves on adjoining faces of said sliding structure and said stationary structure, each of said grooves including a pair of raised surfaces extending in the direction of linear motion of said sliding member, wherein said bearing means comprises balls riding on the two pairs of raised surfaces in each of said raceways;
   said stationary structure including means for adjusting the friction on said ball bearings in said raceways.

2. The drive of claim 1 wherein said bearing means further includes means for spacing said ball bearings in said raceways.

* * * * *